(12) United States Patent
Sidelkovskiy

(10) Patent No.: US 11,027,827 B2
(45) Date of Patent: Jun. 8, 2021

(54) METHOD FOR SEPARATED FLOW DETECTION

(71) Applicant: UNITED TECHNOLOGIES CORPORATION, Farmington, CT (US)

(72) Inventor: Dmitriy B. Sidelkovskiy, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 630 days.

(21) Appl. No.: 16/121,517

(22) Filed: Sep. 4, 2018

(65) Prior Publication Data

US 2020/0070962 A1    Mar. 5, 2020

(51) Int. Cl.
| | |
|---|---|
| *B64C 21/06* | (2006.01) |
| *B64D 29/00* | (2006.01) |
| *B64D 33/02* | (2006.01) |
| *F01D 17/08* | (2006.01) |
| *F02C 7/057* | (2006.01) |

(52) U.S. Cl.
CPC ............ *B64C 21/06* (2013.01); *B64D 29/00* (2013.01); *B64D 33/02* (2013.01); *F01D 17/08* (2013.01); *F02C 7/057* (2013.01); *B64C 2230/04* (2013.01); *F05D 2270/102* (2013.01); *F05D 2270/3011* (2013.01)

(58) Field of Classification Search
CPC ..... B64C 21/06; B64C 2230/04; B64D 29/00; B64D 33/02; F01D 17/08; F02C 7/057; F02C 7/04; F05D 2270/3011; F05D 2270/102

See application file for complete search history.

(56) References Cited

U.S. PATENT DOCUMENTS

| | | |
|---|---|---|
| 3,938,319 A | 2/1976 | Thomson |
| 4,025,008 A | 5/1977 | Peikert |
| 4,872,807 A | 10/1989 | Thompson |
| 5,259,234 A | 11/1993 | Keller et al. |
| 8,105,015 B2 | 1/2012 | Moore et al. |
| 9,157,368 B2 | 10/2015 | Hurwitz et al. |
| 9,334,807 B2 | 5/2016 | deGaribody |
| 9,789,954 B2 | 10/2017 | Kestler et al. |
| 2016/0311520 A1 | 10/2016 | Khidekel |

FOREIGN PATENT DOCUMENTS

| | | |
|---|---|---|
| EP | 0628727 | 12/1994 |
| EP | 628727 A1 * | 12/1994 |
| EP | 2034159 | 3/2009 |

OTHER PUBLICATIONS

European Patent Office, European Search Report dated Jan. 22, 2020 in Application No. 19194860.3.

* cited by examiner

*Primary Examiner* — Manuel L Barbee
(74) *Attorney, Agent, or Firm* — Snell & Wilmer L.L.P.

(57) ABSTRACT

A method to predict an onset of flow separation from a surface of an inner barrel of a nacelle is disclosed. In various embodiments, the method includes determining a static pressure distribution about the inner barrel surface of the nacelle; determining a mean static pressure value and a minimum static pressure value using the static pressure distribution; determining a separation indicator value using the mean static pressure value and the minimum static pressure value; and comparing the separation indicator value against a separation threshold value.

20 Claims, 6 Drawing Sheets

METHOD FOR SEPARATED FLOW DETECTION

FIELD

The present disclosure relates to gas turbine engines and, more particularly, to apparatus and methods used to detect flow separation on the interior surface of a nacelle inlet duct during flight.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

A nacelle typically houses a gas turbine engine used to power an aircraft, and proper design of the nacelle can contribute to overall engine performance and operability of the aircraft. For example, inlet lip thickness and diffuser length associated with the nacelle are typically sized to provide uniform inlet flow to the engine during take-off, climb and high angle of attack operation and during take-off where crosswind conditions are present. During certain operational conditions—e.g., while operating the engine at high angle of attack or during crosswind condition during take-off —the flow of air immediately adjacent the surface of the nacelle (or the boundary layer of the flow) may separate from the surface, resulting in potentially lower overall engine performance. Methods and apparatus used to detect the onset of flow separation within an engine nacelle are therefore desirable.

SUMMARY

A method to predict an onset of flow separation from a surface of an inner barrel of a nacelle is disclosed. In various embodiments, the method includes determining a static pressure distribution about the inner barrel surface of the nacelle; determining a mean static pressure value and a minimum static pressure value using the static pressure distribution; determining a separation indicator value using the mean static pressure value and the minimum static pressure value; and comparing the separation indicator value against a separation threshold value.

In various embodiments, determining the static pressure distribution about the surface of the inner barrel includes receiving by a controller a discrete set of static pressure values taken from the surface of the inner barrel. In various embodiments, the discrete set of static pressure values is taken from a reference plane positioned circumferentially about the surface of the inner barrel.

In various embodiments, determining the mean static pressure value comprises calculating by the controller an arithmetic mean of the discrete set of static pressure values. In various embodiments, determining the minimum static pressure value comprises calculating by the controller an arithmetic minimum of the discrete set of static pressure values. In various embodiments, determining the separation indicator value using the mean static pressure value and the minimum static pressure value comprises calculating by the controller an arithmetic difference by subtracting the mean static pressure value from the minimum static pressure value.

In various embodiments, determining the separation indicator value using the mean static pressure value and the minimum static pressure value further comprises normalizing the separation indicator value by a total pressure value to obtain a normalized-separation indicator value. In various embodiments, comparing the separation indicator value against the separation threshold value comprises determining by the controller whether the normalized-separation indicator value is less than or greater than the separation threshold value. In various embodiments, comparing the separation indicator value against the separation threshold value comprises comparing the separation indicator value against a first separation threshold value to predict the onset of flow separation and comparing the separation indicator value against a second separation threshold value to predict an occurrence of flow separation. In various embodiments, the separation threshold value is within a range equal from about negative ten one-hundredths to about negative twelve one-hundredths.

A system to predict an onset of flow separation from a surface of an inner barrel of a nacelle is disclosed. In various embodiments, the system includes a plurality of static pressure sensors distributed about the surface of the inner barrel; and a controller configured to: calculate a static pressure distribution about the inner barrel surface of the nacelle using data provided to the controller from the plurality of static pressure sensors; calculate a mean static pressure value and a minimum static pressure value using the static pressure distribution; calculate a separation indicator value using the mean static pressure value and the minimum static pressure value; and compare the separation indicator value against a separation threshold value.

In various embodiments, the plurality of static pressure sensors is positioned circumferentially about a reference plane and configured to provide a discrete set of static pressure values. In various embodiments, the mean static pressure value is determined by the controller by calculating an arithmetic mean of the discrete set of static pressure values. In various embodiments, the minimum static pressure value is determined by the controller by calculating an arithmetic minimum of the discrete set of static pressure values. In various embodiments, the separation indicator value is determined by the controller by subtracting the mean static pressure value from the minimum static pressure value.

In various embodiments, a total pressure sensor is configured to provide a total pressure value to the controller and the controller is configured to determine a normalized-separation indicator value by normalizing the separation indicator value by the total pressure value. In various embodiments, the separation threshold value is within a range equal from about negative ten one-hundredths to about negative twelve one-hundredths. In various embodiments, the controller is configured to calculate whether the normalized-separation indicator value is less than or greater than the separation threshold value.

A gas turbine engine is disclosed. In various embodiments, the gas turbine engine includes a nacelle having an inner barrel surface; a plurality of static pressure sensors spaced circumferentially about the inner barrel surface; and a controller configured to: calculate a static pressure distribution about the inner barrel surface of the nacelle using data provided to the controller from the plurality of static pressure sensors; calculate a mean static pressure value and a minimum static pressure value using the static pressure distribution; calculate a separation indicator value using the mean static pressure value and the minimum static pressure value; and compare the separation indicator value against a separation threshold value.

In various embodiments, the controller is configured to calculate the separation indicator value is by subtracting the mean static pressure value from the minimum static pressure value and wherein the controller is configured to calculate a normalized-separation indicator value by normalizing the separation indicator value by a total pressure value.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
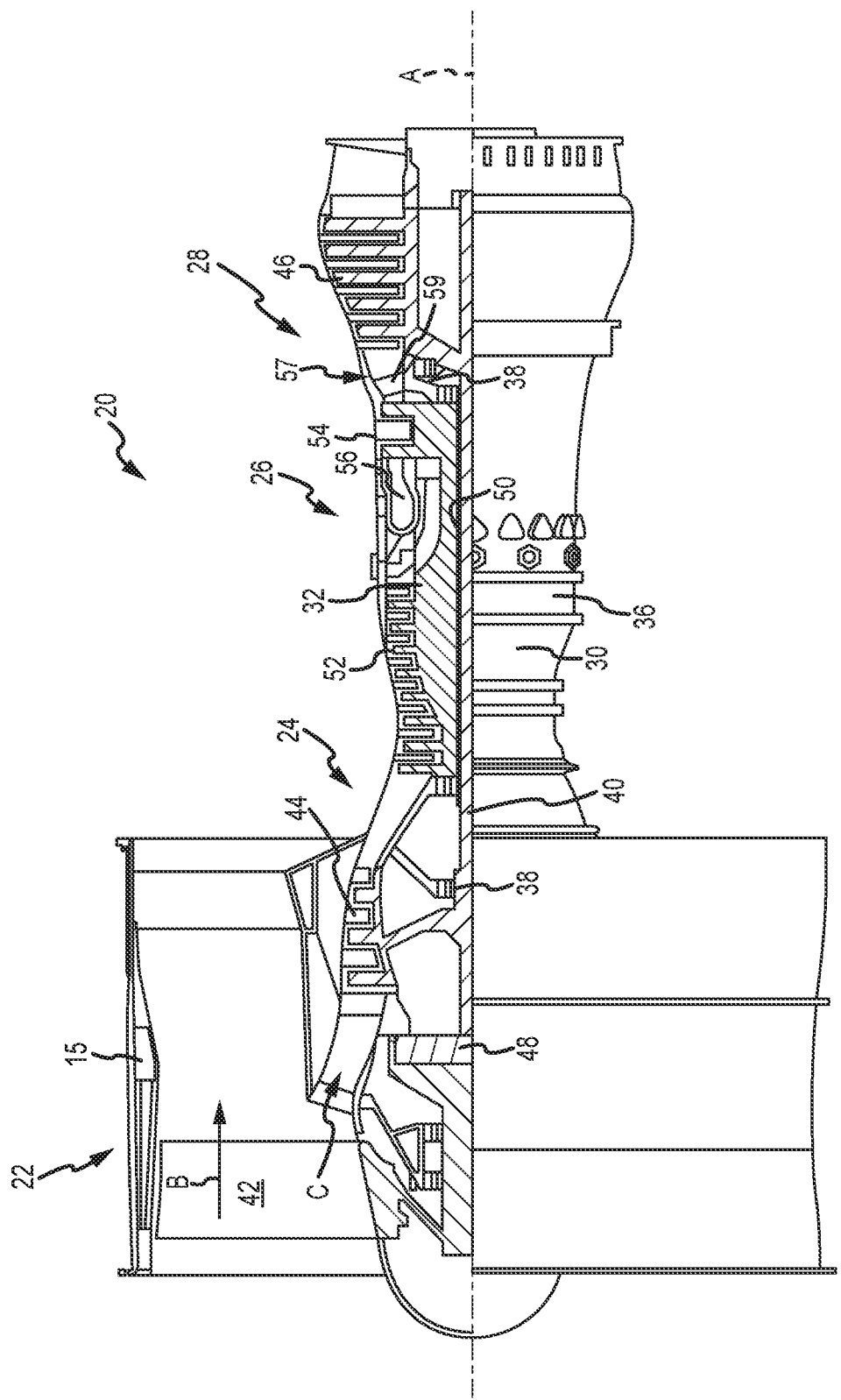
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
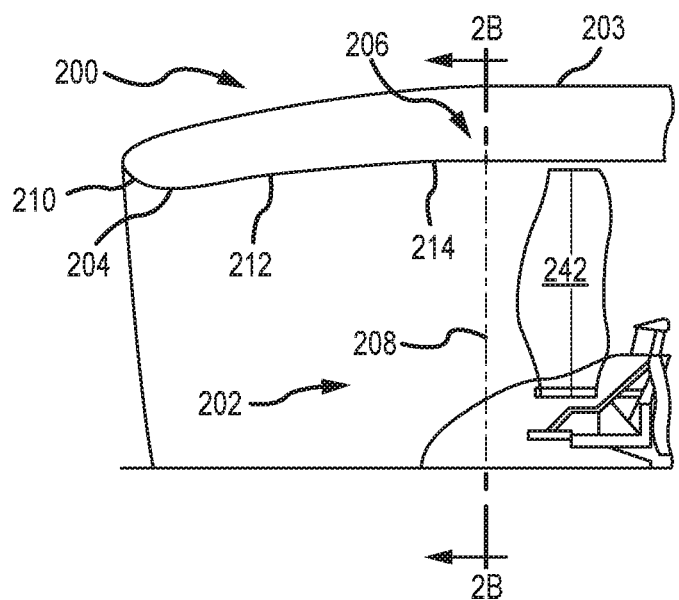
FIG. 2A is a cross sectional schematic view of a nacelle section of a gas turbine engine, in accordance with various embodiments.
Figure 2B:
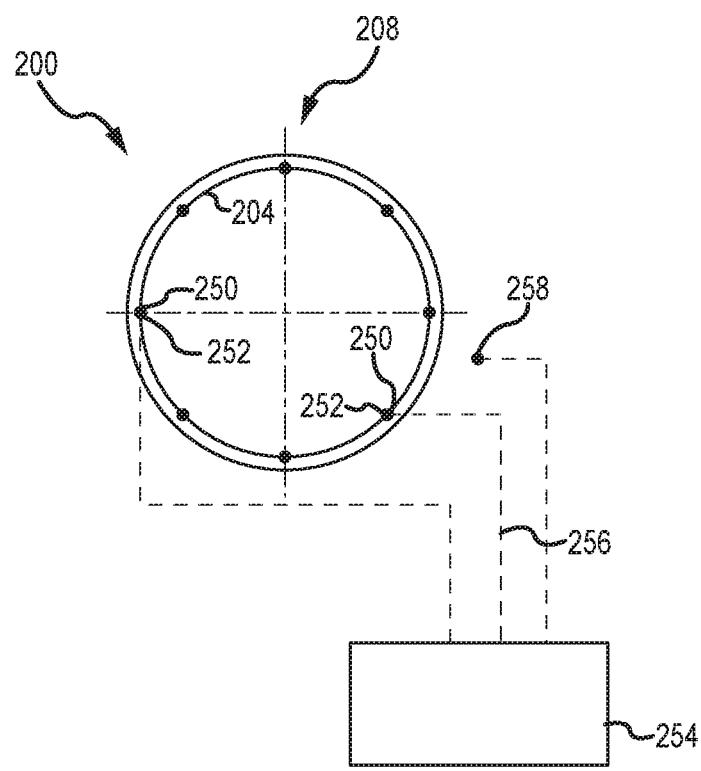
FIG. 2B is an axial schematic view of a nacelle section of a gas turbine engine, in accordance with various embodiments.

Referring now to FIGS. 2A and 2B, cross sectional and axial schematic view of a nacelle section 200 of a gas turbine engine are provided, in accordance with various embodiments. Similar to the gas turbine engine 20 described above with reference to FIG. 1, the nacelle section 200 houses a fan section 222 that itself includes a fan 242. The nacelle section 200 includes an inlet 202 through which airflow enters the engine, a nacelle 203 that defines the inlet geometry and an inner barrel 204 of the nacelle 203 that extends both upstream and downstream of the fan 242. In various embodiments, the nacelle 203 defines an inlet lip 210 at an upstream portion of the inner barrel 204, an inlet diffuser 212 downstream of the inlet lip 210 and a rear portion 214 of the inlet diffuser 212. Upstream of the fan 242, a plurality of static pressure sensors 250 are positioned circumferentially about the inner barrel 204 along a reference plane 208 positioned upstream of the fan 242. In various embodiments, the number of static pressure sensors 250 totals eight (8) and are spaced equally in forty-five degree (45°) increments from a top-dead-center position 206. In various embodiments, the static pressure sensors 250 are positioned about a reference plane 208 positioned a constant axial distance upstream of the fan 242.

In various embodiments, the static pressure sensors 250 are configured to determine whether a boundary layer separation on the inner barrel is imminent or has occurred. In various embodiments, a boundary layer separation can occur when the static pressure within the boundary layer increases along the flow direction, thereby causing a stagnation or reversal of the flow direction proximate the surface of the inner barrel 204. In various embodiments, the static pressure sensors 250 are static pressure taps 252 that communicate the local static pressure, $P_S$, measured at each of the static pressure taps 252 to a controller 254 via one or more data lines 256 extending from each of the static pressure taps 252 to the controller 254. In various embodiments, the data lines 256 are simple tubes that terminate at a pressure sensor within or proximate the controller 254. In various embodiments, the data lines 256 are wires that transmit electronic signals from one or more sensors positioned proximate the static pressure taps 252. In various embodiments, a total pressure sensor 258 communicates the ambient total pressure, $P_T$, to the controller 254. The total pressure, $P_T$, may be used, in various embodiments, to normalize the values of the local static pressure, $P_S$. In various embodiments, the total pressure sensor 258 is positioned upstream of the nacelle section 200, such as, for example, on the fuselage of the aircraft, in order to provide a measurement undisturbed by the air flowing into the inlet 202. In various embodiments, one of the data lines 256 transmits data representative of the ambient total pressure, $P_T$, to the controller 254. In various embodiments the total pressure, $P_T$, of the free stream may be calculated from other air data measurements, such as, for example, the velocity, density and static pressure of the free stream.

In various embodiments, the controller 254 is configured to calculate a value indicative of the onset or occurrence of boundary layer separation from the surface of the inner barrel 204, for example, at or downstream of the reference plane 208. In various embodiments, a static pressure value, $P_{Si}$, is provided to the controller 254, representative of the static pressure measured at or by each of the static pressure sensors 250 or the static pressure taps 252. In various embodiments, the controller 254 determines an average or mean static pressure value, $P_{Savg}$, representing an arithmetic average or mean of the static pressure values, $P_{Si}$, such that, for example, $P_{Savg}=\Sigma P_{Si}/N$ (i=1, N), where N is the number of static pressure sensors 250 or static pressure taps 252. In various embodiments, the controller 254 determines a minimum static pressure value, $P_{Smin}$, representing the arithmetic minimum static pressure value over each of the individual static pressure values, $Ps_i$, such that $P_{Smin}=\min Ps_i$ (i=1, N). In various embodiments, the controller 254 determines a separation indicator, $\Delta P_{SEP}$, such that, for example, $\Delta P_{SEP}=P_{Smin}-P_{Savg}$. In various embodiments, as described further below, the separation indicator, $\Delta P_{SEP}$, provides an indication of the onset or occurrence of separation of the flow from the inner barrel 204 of the nacelle section 200 depending on whether the value of $\Delta P_{SEP}$ is greater or less than a separation threshold value. In various embodiments, the separation indicator, $\Delta P_{SEP}$, may be normalized by the total pressure, $P_T$, of the free stream to provide a normalized separation indicator, $\Delta P_{SEP\_N}$, where $\Delta P_{SEP\_N}=(P_{Smin}-P_{Savg})/P_T$. In various embodiments, rather than computing the normalized separation indicator, $\Delta P_{SEP\_N}$, which requires determination of the total pressure, $P_T$, of the free stream, a dimensionless separation indicator, $\Delta P_{SEP\_D}$, may be determined, where $\Delta P_{SEP\_D}=(P_{Smin}/P_{Savg}-1)$. In practice, it is found that $\Delta P_{SEP\_N} \approx \Delta P_{SEP\_D}$, at least for the cases described below in the following paragraphs.

Figure 3A:
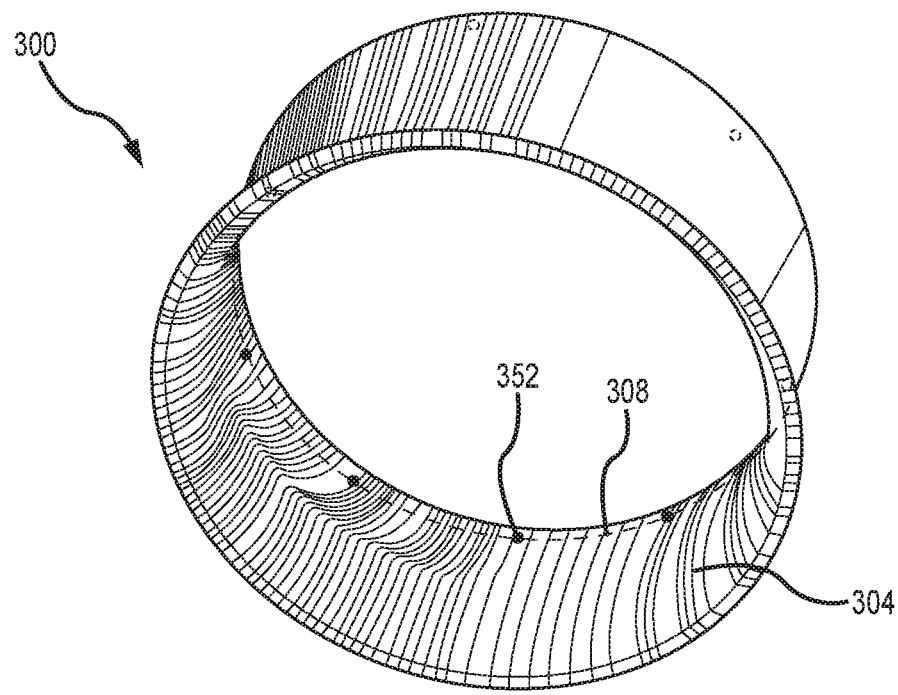
FIGS. 3A, 3B and 3C depict simulated results illustrating separation free, fully separated and separated followed by reattachment flow regimes with respect to an inner barrel surface of a nacelle, in accordance with various embodiments.
Figure 3B:
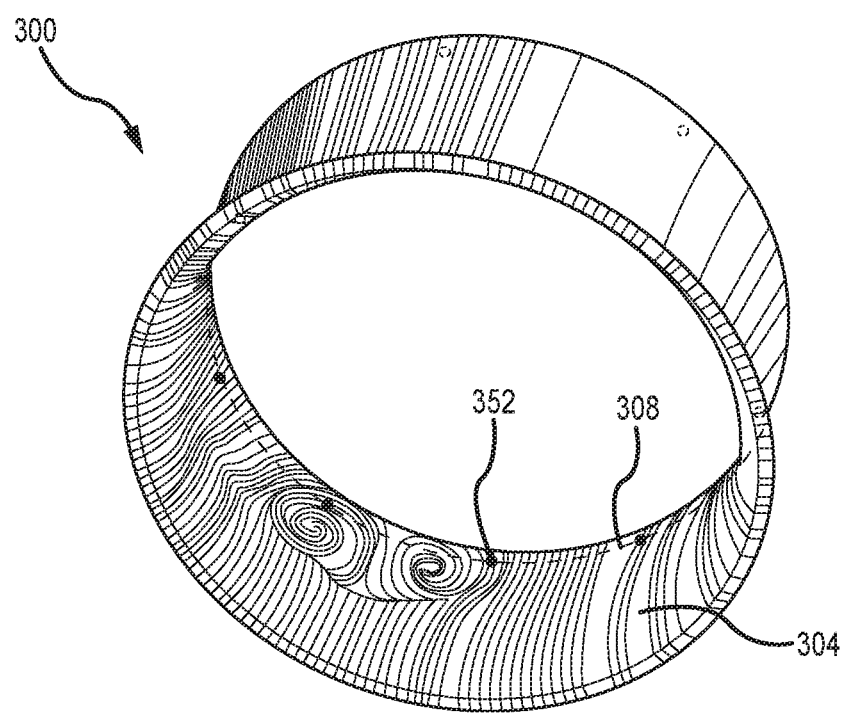
Figure 3C:
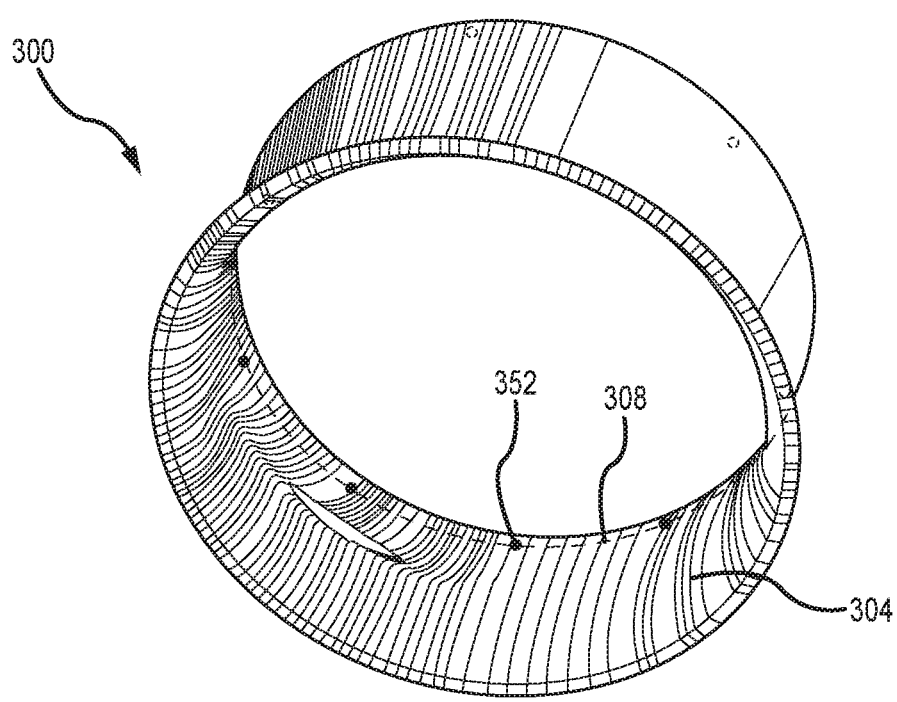

Referring now to FIGS. 3A, 3B and 3C, the surface of an inner barrel 304 of a nacelle section 300 is illustrated with flow streamlines resulting from computational flow studies at three ambient free stream conditions, in accordance with various embodiments. A reference plane 308 (whose intersection with the inner barrel 304 is indicated by the dashed line) indicates the locations where a number of static pressure taps 352 are positioned about the inner barrel 304. Referring to FIG. 3A, for example, a generally smooth and uniform airflow without separation is illustrated (Case 1). For this example, the normalized separation indicator, $\Delta P_{SEP\_N}$, determined as described above for the case of N=8, is equal to approximately negative five one-hundredths (−0.05 or −5%). As indicated in the figure, the flow at the reference plane, upstream of the fan, remains attached to the surface of the inner barrel 304. Referring next to FIG. 3B, for example, a generally non-smooth and non-uniform separated airflow is illustrated (Case 2). For this example, the normalized separation indicator, $\Delta P_{SEP\_N}$, determined as described above for the case of N=8, is equal to approximately negative twelve one-hundredths (−0.12 or −12%). As indicated in FIG. 3B, the flow at the reference plane, upstream of the fan, has separated from the surface of the inner barrel 304, resulting in the occurrence of twin vortices upstream of the reference plane 308 (i.e, upstream of the dashed line). Referring next to FIG. 3C, which represents conditions between Case 1 and Case 2, the airflow exhibits a flow that is separated followed by reattachment. For this example, the normalized separation indicator, $\Delta P_{SEP\_N}$, determined as described above for the case of N=8, is equal to approximately negative seven one-hundredths (−0.07 or −7%). As indicated in the figure, the flow upstream of the reference plane exhibits a separated flow, followed by reattachment, resulting in smooth airflow following reattachment on the surface of the inner barrel 304 in front of fan.

According to various embodiments, a normalized separation threshold, $P_{THRES\_N}$, may be established, such that: (i) for separation free flow conditions (e.g., Case 1), $P_{THRES\_N}$ falls within a range equal to about negative five one-hundredths (−0.05 or −5%) to about negative six one-hundredths (−0.06 or −6%); (ii) for separated flow conditions (Case 2), $P_{THRES\_N}$ falls within a range equal to less than about negative ten one-hundredths (−0.10 or −10%); and (iii) for separated flow followed by reattachment conditions (Case 3), $P_{THRES\_N}$ falls within a range equal to about negative six one-hundredths (−0.06 or −6%) to about negative ten one-hundredths (−0.10 or −10%).

Figure 4:
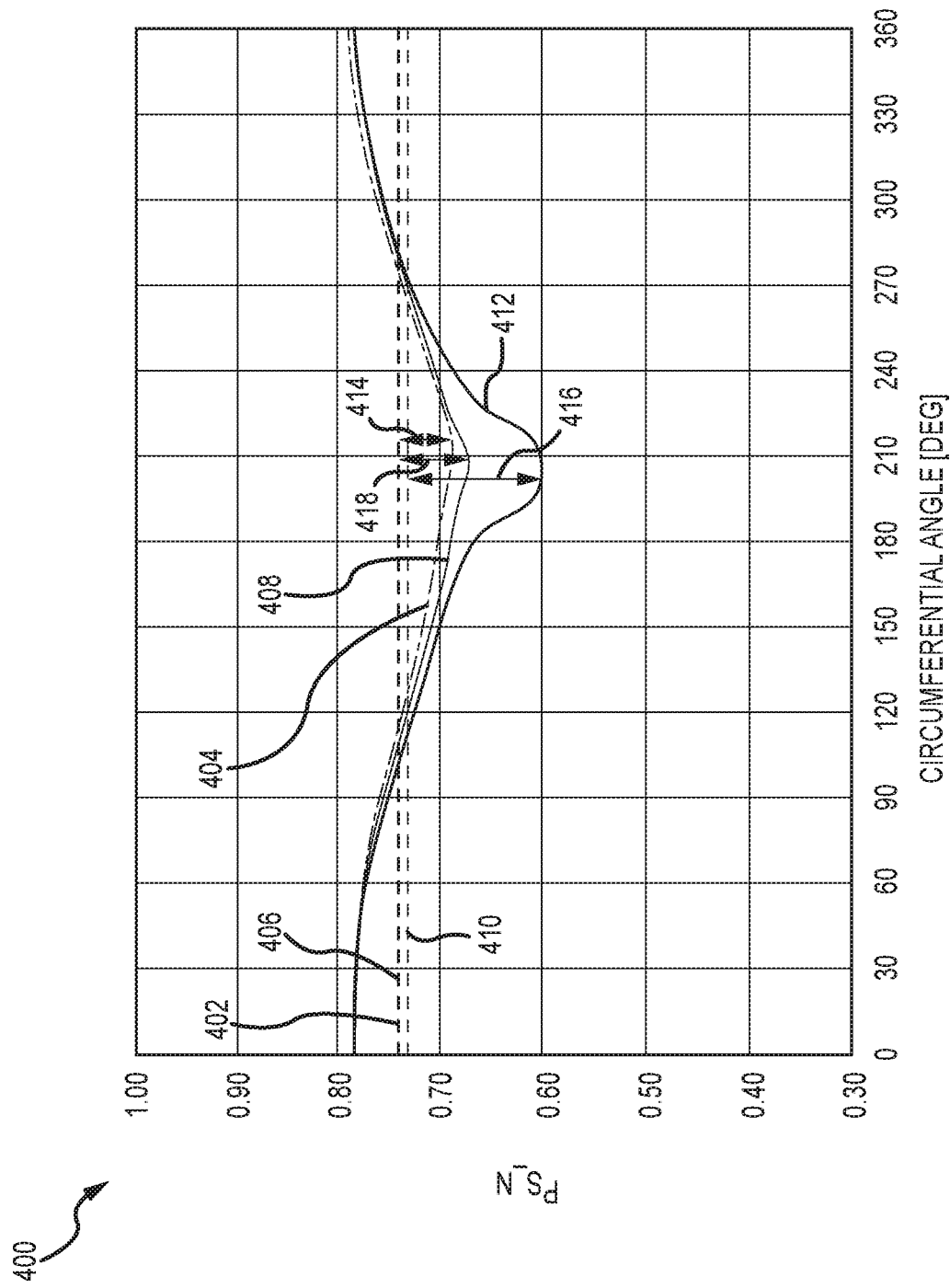
FIG. 4 depict computer results illustrating the onset and occurrence of flow separation from an inner barrel surface of a nacelle, in accordance with various embodiments.

Referring now to FIG. 4, a plot 400 illustrating the onset or occurrence of flow separation within a nacelle is provided, in accordance with various embodiments, for high angle of attack conditions. The results illustrate a normalized minimum static pressure value, $P_{Smin\_N}$ and a normalized average static pressure value, $P_{Savg\_N}$, as described above, plotted as a function of circumferential angle, $\theta$, about a reference plane extending through an inner barrel of a nacelle section, such as, for example, the reference plane 308 (indicated by the dashed line) extending through the inner barrel 304 and the nacelle section 300 described above with reference to FIGS. 3A, 3B, and 3C. Results are plotted for the three inlet airflow cases discussed above, respectively: (i) smooth uniform airflow without separation (Case 1); (ii) separated airflow (Case 2), and (iii) separated airflow followed by reattachment (Case 3).

For Case 1, the normalized average static pressure value $(P_{Savg\_N})$ 402 and the normalized static pressure value $(P_{S\_N})$ 404, normalized by the ambient total pressure, $P_T$, are provided as a function of circumferential angle, $\theta$. As indicated, a normalized separation indicator, $\Delta P_{SEP\_N} = (P_{Smin} P_{Savg})/P_T$, may be determined to equal approximately negative five one-hundredths (−0.05 or −5%) at a circumferential angle, $\theta$, equal to about two hundred twenty degrees)(220° 414. For Case 2, the normalized average static pressure value $(P_{Savg\_N})$ 410 and the normalized static pressure value $(P_{S\_N})$ 412, normalized by the ambient total pressure, $P_T$, are provided as a function of circumferential angle, $\theta$. As indicated, the normalized separation indicator, $\Delta P_{SEP\_N} = (P_{Smin} - P_{Savg})/P_T$, may be determined to equal approximately negative twelve one-hundredths (−0.12 or −12%) at a circumferential angle, $\theta$, equal to about two hundred degrees)(200° 416. For Case 3, representing conditions between Case 1 and Case 2, where the inlet airflow separates, followed by reattachment, the normalized average static pressure value $(P_{Savg\_N})$ 406 and the normalized static pressure value $(P_{S\_N})$ 408, normalized by the ambient total pressure, $P_T$, are provided as a function of circumferential angle, $\theta$. As indicated, the normalized separation indicator, $\Delta P_{SEP\_N} = (P_{Smin} - P_{Savg})/P_T$, may be determined to equal approximately negative seven one-hundredths (−0.07 or −7%) at a circumferential angle, $\theta$, equal to about two hundred five degrees)(205° 418.

The characteristics of $P_{Smin\_N}$ vs. $\theta$ for Case 1 and Case 3 are consistent with and indicate attached flow—e.g., $P_{Smin\_N}$ shows a gradual trend above and below the normalized average static pressure, $P_{Savg\_N}$, about the circumference of the inner barrel on the reference plane. In contrast, Case 2 shows characteristics consistent with separated flow—e.g., a sharp reduction in $P_{Smin\_N}$ from the normalized average at a region within the inner barrel on the reference plane. Selecting a normalized separation threshold, $P_{THRES\_N}$, equal to negative ten one-hundredths (−0.10 or −10%) provides an accurate indicator of the behavior of the flow about the circumference of the inner barrel on the reference plane. In other words, Case 1 and Case 3 both have values of the normalized separation indicator, $\Delta P_{SEP\_N}$, greater than the normalized separation threshold, $P_{THRES\_N}$, while Case 2 has a value of the normalized separation indicator, $\Delta P_{SEP\_N}$, less than the normalized separation threshold, $P_{THRES\_N}$. In various embodiments, the normalized separation threshold, $P_{THRES\_N}$, may comprise two values, a first value, $P_{THRES.1\_N}$, being used to predict the onset of separation and a second value, $P_{THRES.2\_N}$, being used to predict the occurrence of separation. In various embodiments, $P_{THRES.1\_N}$ falls within a range equal to about negative three one-hundredths (−0.03 or −3%) to about negative seven one-hundredths (−0.07 or −7%); in various embodiments, $P_{THRES.1\_N}$ falls within a range equal to about negative four one-hundredths (−0.04 or −4%) to about negative six one-hundredths (−0.06 or −6%); and in various embodiments, $P_{THRES.1\_N}$ equals about negative five one-hundredths (−0.05 or −5%). In various embodiments, $P_{THRES.2\_N}$ falls within the same range of values described above for the normalized separation indicator, $\Delta P_{SEP\_N}$, with reference to FIG. 3B—e.g., $P_{THRES.2\_N}$ falls within a range equal to about negative ten one-hundredths (−0.10 or −10%) to about negative twelve one-hundredths (−0.12 or −12%).

Figure 5:
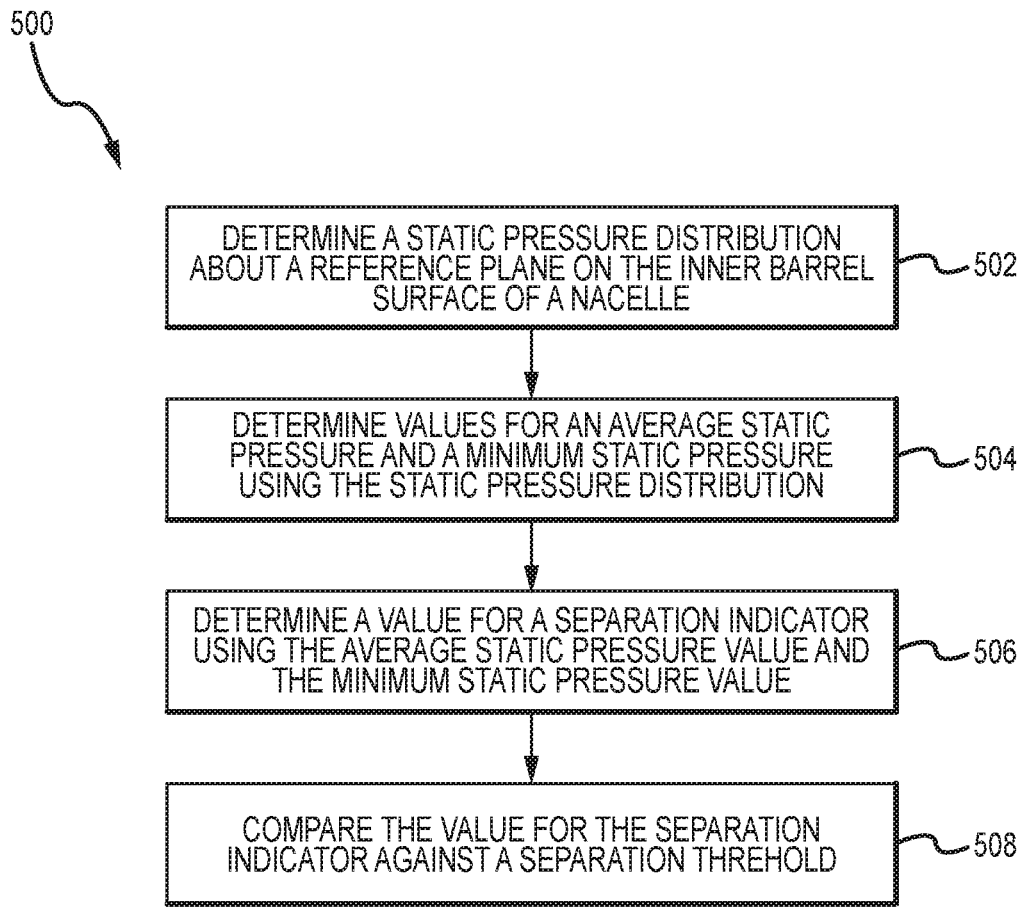
FIG. 5 is a flowchart, detailing various steps used to determine the onset or occurrence of flow separation from the surface of an inner barrel of a nacelle, in accordance with various embodiments.

Referring now to FIG. 5, a flowchart 500 is provided, detailing various steps used to determine the onset or occurrence of flow separation from the surface of an inner barrel of a nacelle, in accordance with various embodiments. A first step 502 involves determining a static pressure distribution about a reference plane on the inner barrel surface of a nacelle. In various embodiments, the static pressure distribution is determined at a set of N discrete points positioned circumferentially about the inner barrel at the reference plane. In various embodiments, the static pressure distribution is normalized, for example, by a value for the total pressure of the ambient free stream. A second step 504 involves determining values for an average static pressure and a minimum static pressure using the static pressure distribution. In various embodiments, the average static pressure value is the average or mean of the N values of static pressure and the minimum static pressure value is the minimum of the N values of static pressure. A third step 506 involves determining a value for a separation indicator using the average static pressure value and the minimum static pressure value. In various embodiments, the separation indicator is determined by subtracting the average static pressure value from the minimum static pressure value. In various embodiments, the separation indicator is normalized by the value for the total pressure of the ambient free stream. A fourth step 508 involves comparing the value for the separation indicator against a separation threshold to determine the onset or occurrence of flow separation from the surface of the inner barrel of the nacelle. In various embodiments, the separation threshold may comprise two values, a first separation threshold for determining the onset of flow separation and a second separation threshold for determining the occurrence of flow separation. In various embodiments, each of the foregoing steps is carried out using normalized values, where the various pressure values, indicators and thresholds are normalized using, for example, the total pressure of the ambient free stream.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method to predict an onset of flow separation from a surface of an inner barrel of a nacelle, comprising:
    determining a static pressure distribution about the inner barrel surface of the nacelle;
    determining a mean static pressure value and a minimum static pressure value using the static pressure distribution;
    determining a separation indicator value using the mean static pressure value and the minimum static pressure value; and
    comparing the separation indicator value against a separation threshold value.

2. The method of claim 1, wherein determining the static pressure distribution about the surface of the inner barrel includes receiving by a controller a discrete set of static pressure values taken from the surface of the inner barrel.

3. The method of claim 2, wherein the discrete set of static pressure values is taken from a reference plane positioned circumferentially about the surface of the inner barrel.

4. The method of claim 2, wherein determining the mean static pressure value comprises calculating by the controller an arithmetic mean of the discrete set of static pressure values.

5. The method of claim 4, wherein determining the minimum static pressure value comprises calculating by the controller an arithmetic minimum of the discrete set of static pressure values.

6. The method of claim 5, wherein determining the separation indicator value using the mean static pressure value and the minimum static pressure value comprises calculating by the controller an arithmetic difference by subtracting the mean static pressure value from the minimum static pressure value.

7. The method of claim 6, wherein determining the separation indicator value using the mean static pressure value and the minimum static pressure value further comprises normalizing the separation indicator value by a total pressure value to obtain a normalized-separation indicator value.

8. The method of claim 7, wherein the separation threshold value is within a range equal from about negative ten one-hundredths to about negative twelve one-hundredths.

9. The method of claim 8, wherein comparing the separation indicator value against the separation threshold value comprises determining by the controller whether the normalized-separation indicator value is less than or greater than the separation threshold value.

10. The method of claim 1, wherein comparing the separation indicator value against the separation threshold value comprises comparing the separation indicator value against a first separation threshold value to predict the onset of flow separation and comparing the separation indicator value against a second separation threshold value to predict an occurrence of flow separation.

11. A system to predict an onset of flow separation from a surface of an inner barrel of a nacelle, comprising:
    a plurality of static pressure sensors distributed about the surface of the inner barrel; and
    a controller configured to:
        calculate a static pressure distribution about the inner barrel surface of the nacelle using data provided to the controller from the plurality of static pressure sensors;
        calculate a mean static pressure value and a minimum static pressure value using the static pressure distribution;
        calculate a separation indicator value using the mean static pressure value and the minimum static pressure value; and
        compare the separation indicator value against a separation threshold value.

12. The system of claim 11, wherein the plurality of static pressure sensors is positioned circumferentially about a reference plane and configured to provide a discrete set of static pressure values.

13. The system of claim 12, wherein the mean static pressure value is determined by the controller by calculating an arithmetic mean of the discrete set of static pressure values.

14. The system of claim 13, wherein the minimum static pressure value is determined by the controller by calculating an arithmetic minimum of the discrete set of static pressure values.

15. The system of claim 14, wherein the separation indicator value is determined by the controller by subtracting the mean static pressure value from the minimum static pressure value.

16. The system of claim 15, further comprising a total pressure sensor configured to provide a total pressure value to the controller and wherein the controller is configured to determine a normalized-separation indicator value by normalizing the separation indicator value by the total pressure value.

17. The system of claim 16, wherein the separation threshold value is within a range equal from about negative ten one-hundredths to about negative twelve one-hundredths.

18. The system of claim 17, wherein the controller is configured to calculate whether the normalized-separation indicator value is less than or greater than the separation threshold value.

19. A gas turbine engine, comprising:
a nacelle having an inner barrel surface;
a plurality of static pressure sensors spaced circumferentially about the inner barrel surface;
a controller configured to:
calculate a static pressure distribution about the inner barrel surface of the nacelle using data provided to the controller from the plurality of static pressure sensors;
calculate a mean static pressure value and a minimum static pressure value using the static pressure distribution;
calculate a separation indicator value using the mean static pressure value and the minimum static pressure value; and
compare the separation indicator value against a separation threshold value.

20. The gas turbine engine of claim 19, wherein the controller is configured to calculate the separation indicator value is by subtracting the mean static pressure value from the minimum static pressure value and wherein the controller is configured to calculate a normalized-separation indicator value by normalizing the separation indicator value by a total pressure value.

* * * * *